United States Patent [19]

Moss

[11] 4,080,431
[45] Mar. 21, 1978

[54] RECOVERY OF REFRACTORY HARD METAL POWDER PRODUCT

[75] Inventor: Robert L. Moss, Wadsworth, Ohio

[73] Assignee: PPG Industries, Inc., Pittsburgh, Pa.

[21] Appl. No.: 752,220

[22] Filed: Dec. 20, 1976

[51] Int. Cl.$^2$ .................. C01B 31/30; C01B 21/06; C01B 35/04

[52] U.S. Cl. .................. 423/289; 423/297; 423/409; 423/411; 423/439; 423/440; 75/.5 BB; 250/427; 204/164; 55/523

[58] Field of Search .......... 423/289, 297, 439, 440, 423/444, 409, 411, 412; 204/164; 250/547; 75/.5 B, .5 BB; 55/523

[56] References Cited

U.S. PATENT DOCUMENTS

| | | | |
|---|---|---|---|
| 3,244,482 | 4/1966 | Culburtson et al. | 423/297 |
| 3,253,886 | 5/1966 | Lamprey et al. | 423/289 |
| 3,661,523 | 5/1972 | Sheppard et al. | 423/440 |
| 3,840,750 | 10/1974 | Davis et al. | 250/547 |
| 3,979,500 | 9/1976 | Sheppard et al. | 423/440 X |

*Primary Examiner*—G. O. Peters
*Attorney, Agent, or Firm*—Irwin M. Stein; William M. Dooley

[57] ABSTRACT

Finely divided borides, carbides, and nitrides of metals of Groups III-VI of the Periodic Table, formed by reacting vaporous metal halide and a boron, carbon, or nitrogen source reactant at high temperatures, e.g., 1500° C., are separated from gaseous reactor effluent stream at temperatures between about 200° C. and 1500° C. with the use of a porous sintered filter. By separating the finely divided product from the effluent stream before the stream cools to below about 200° C., adsorption of impurities, e.g., unreacted metal halide or metal subhalides, on the product is reduced. The use of a filter, e.g., a porous sintered filter, avoids the size classification of product which may result when cyclones and a bag filter are used to collect product.

8 Claims, 1 Drawing Figure

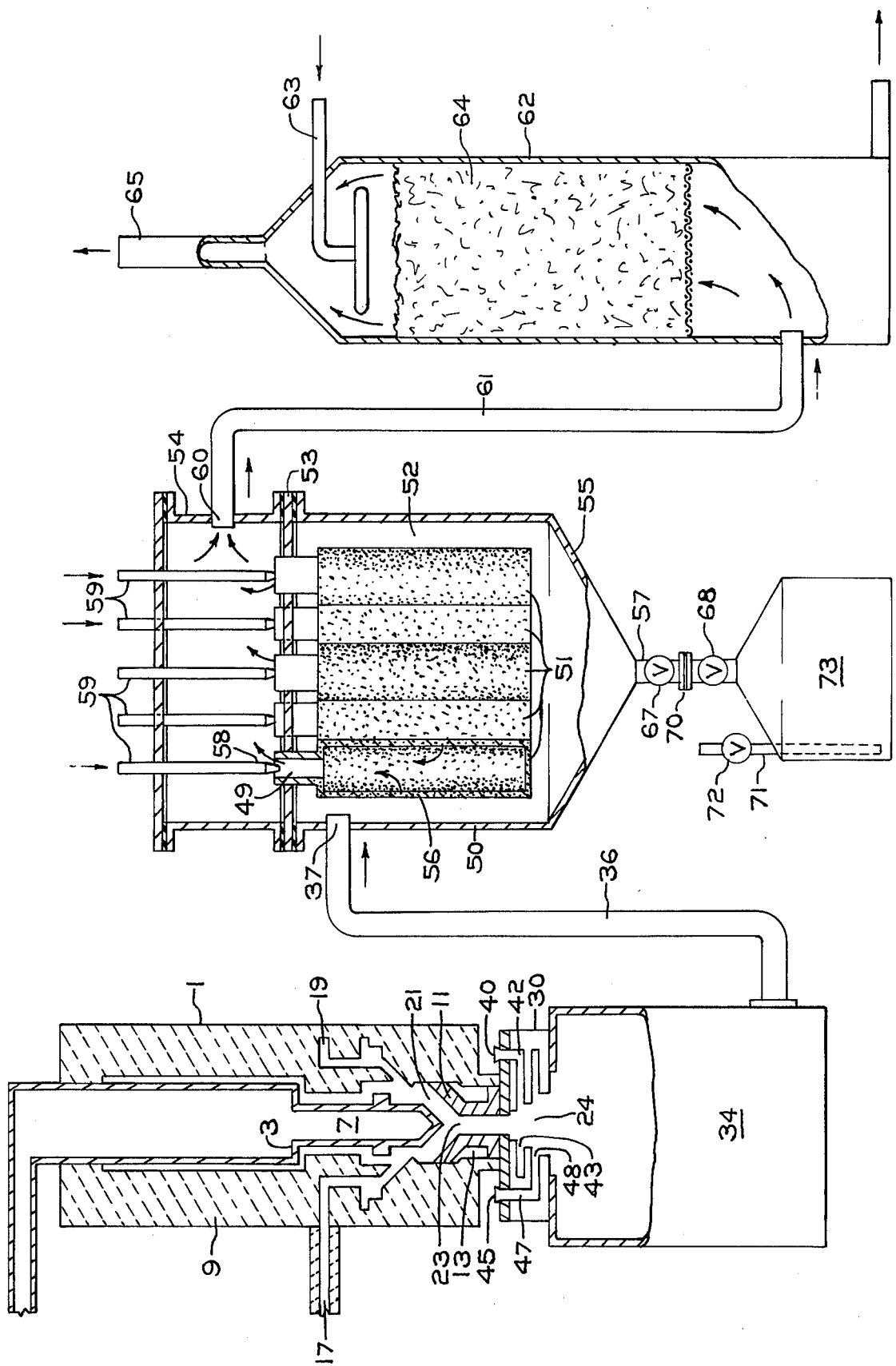

RECOVERY OF REFRACTORY HARD METAL POWDER PRODUCT

BACKGROUND OF THE INVENTION

This invention relates to the production of finely divided refractory hard metals, that is, borides, carbides, and nitrides of metals of Groups III–VI of the Periodic Table of the Elements, by vapor phase reaction of vaporous metal halide and a vaporous source of boron, carbon, or nitrogen in a reactor at high temperatures, and relates particularly to the separation of entrained finely divided product from the reactor effluent stream.

U.S. Pat. No. 3,979,500 describes the preparation of Groups III–VI metal borides, carbides, and nitrides by reaction in the vapor phase of the corresponding vaporous metal halide with a source of boron, carbon, or nitrogen respectively in a reactor. U.S. Pat. No. 3,661,523 describes the preparation of finely divided titanium carbide from titanium tetrachloride in a vapor phase reaction, and states that product of improved purity may be obtained by heat treating the product, for example, by collecting the product at temperatures of from about 350° C. to 1500° C., in the substantial absence of air. The collection of product at such high temperatures reduces the level of adsorbed impurity, e.g., unreacted titanium tetrachloride. Air is excluded because the titanium tetrachloride would react with the oxygen or moisture in air upon contact to form titanium oxide coatings on the carbide power, rendering the powder less useful in the preparation of cemented carbide articles.

According to the patent, the titanium carbide can be collected and heat treated in one step, i.e., in the collection vessel, or the process can be performed in separate steps of recovery and heat treatment, which may but need not be successive. In a preferred embodiment, the reactor and the recovery equipment are maintained at 350° C. or above, and the product is held in the receiver at collection temperatures of at least 350° C. for a period of time sufficient to yield a product of reduced impurity, usually for a time sufficient to remove substantially all of the volatile halogen-containing species adsorbed on the product surface. Typical times are said to be from about 30 minutes to about 8 hours. The patent says that product can be held in a heated receiver or treated in a furnace or rotary calciner for, typically, at least 30 minutes.

For separation of product from the effluent gas stream, the patent describes the use of one or more cyclones which discharge product into receivers that optionally are purged with inert gas such as argon and are heated to maintain collected product at 350° C. or higher. However, the use of the described recovery means has disadvantages. Thus, the product, which contains particles in a range of sizes from 0.02 to 1 micron, tends to become partly classified by size in the cyclone, so that the larger particles of product go into the receiver and the smaller particles are carried from the cyclone in the gas stream. If two or more cyclones are used in series, as shown in the FIGURE of the patent, even more classification will occur. In addition, a final filter such as the bag filter shown in the FIGURE, is needed to remove fine particles which escape the cyclone before the effluent gas stream, i.e., the waste gas, is vented. The fines trapped in the bag filter are wasted unless further steps are taken to recover and purify them and blend them with the product in the receiver. Because bag filters usually cannot be operated at the high collection temperatures desired, i.e., 350° C. or higher, any product recovered from the bag filter would require separate treatment. The use of a scrub tower to remove fines from the effluent stream would entail further loss of product, and moisture-sensitive product would be contaminated in the tower.

German Offenlegungsschrift No. 2,523,423, relating to the preparation of submicron titanium boride powder, depicts a similar product recovery system employing cyclones and a final bag filter. The receivers are said to be heated to above 93° C., e.g., from about 93°–316° C., to assist in degassing the product of impurities such as adsorbed unreacted reactants. Purging the receiver with inert gas is also mentioned. In a further purification step, the titanium diboride powder may be heated at 400° to 1000° C. for 1 to 4 hours in a furnace or rotating calciner.

SUMMARY OF THE INVENTION

It has now been found that finely divided refractory hard metal powders such as those prepared as described in the references cited above can be recovered substantially free of adsorbed volatile impurity, e.g., unreacted metal halide, in one step without the problem of classification by particle size and without the need for prolonged calcining. In accordance with this invention, finely divided borides, carbides, and nitrides of metals of Groups III–VI of the Periodic Table are formed in a reactor at high temperatures, i.e., boride, carbide, and nitride forming temperatures, by reaction in the vapor phase of a vaporous metal halide with a vaporous source of boron, carbon, or nitrogen; the finely divided product is withdrawn from the reactor entrained in a gaseous reactor effluent stream and is separated from the effluent stream by passing the stream through a porous metal or refractory filter in a filtration zone, the temperature of the product and the effluent stream being maintained above about 200° C. until they leave the filtration zone; and the product is transferred from the filtration zone to a heated receiver purged with inert gas, e.g., argon. The filter removes substantially all of the finely divided product from the effluent stream, thereby avoiding classification of the product by particle size and the need for a final bag filter.

BRIEF DESCRIPTION OF THE DRAWING

The FIGURE depicts an arc plasma heater and reactor, a filter unit, and an effluent gas scrub tower useful in the practice of this invention.

DETAILED DESCRIPTION OF THE INVENTION

This invention involves an improved technique of recovering finely divided product such as that prepared according to the process described in U.S. Pat. No. 3,979,500 and 3,661,523 and German Offenlegungsschrift No. 2,523,423, which corresponds to U.S. patent applications Ser. Nos. 546,835 and 546,838, both filed Feb. 2, 1975. The disclosures of the three cited references are incorporated herein by reference insofar as they relate to the preparation of finely divided boride, carbide, and nitride powers of the metals of Groups III–VI of the Periodic Table of the Elements. The references explain in considerable detail what reactants, and reaction conditions may be used to produce these powders, illustrate two useful reactors and describe methods of operating them. The finely divided products recovered in accordance with this invention may be in the form of discrete, ultimate particles, e.g., single crystals, or in the form of physical agglomerates of ultimate particles.

Briefly, in these known processes the vaporous halide of the metal and the vaporous source of boron, carbon, or nitrogen are brought together within the reactor at reaction temperatures. The solid products formed are removed from the reaction zone within the reactor, cooled to below reaction temperatures, and recovered by fine particle collection techniques. In order to achieve fine particle size and a narrow particle size distribution, residence times in the reaction zone at reaction temperatures are short, typically in the range of milliseconds as distinguished from seconds or minutes.

In addition to the metal halide and the source of boron, carbon, or nitrogen, U.S. Pat. No. 3,979,500 discloses the customary use of a reducing agent, such as hydrogen, to assist in the reduction of the metal halide. The reducing agent, e.g., hydrogen, is typically used in at least the stoichiometric amount, that is, the amount required to combine with the theoretical amount of halogen liberated during the reaction taking into account the amount of hydrogen available from other sources present in the reactor, such as hydrogen used as a diluent for the vaporous reactants. Often, the amount of hydrogen used will be greater than 10 times, as high as 100 times, the stoichiometric amount.

The present invention is applicable to the vapor phase production of borides, carbides, and nitrides of the metals and metalloids of Groups III, IV, V, and VI of the Periodic Table of the Elements, such as that found inside the back cover of Schwarzkopf and Kieffer, *Refractory Hard Metals* (The MacMillan Company: New York, NY, 1953). Included in Group III are the metals of the actinide series, such as thorium, uranium, neptunium, and plutonium. This invention is particularly applicable to the preparation of borides, carbides, and nitrides of the transition metals of Groups IV–VI, especially those of Groups IV and V of the Periodic Table.

Specific metals and metalloids within the aforementioned groups include: boron, aluminum, silicon, titanium, zirconium, hafnium, tantalum, vanadium, niobium, chromium, molybdenum, tungsten, thorium, uranium, neptunium, and plutonium. As used hereinafter in the specification and claims, the term "metal(s)", when used with reference to elements of Groups III–VI and borides, carbides, and nitrides thereof, is intended to mean and include both the metals and metalloids referred to above. Of particular interest are the metals silicon, titanium, zirconium, hafnium, tantalum, vanadium, niobium, and tungsten.

Among the borides that can be produced in accordance with the present process, there can be mentioned the titanium borides ($TiB$, $TiB_2$), the silicon borides ($SiB_3$, $SiB_6$), the zirconium borides ($ZrB_2$, $ZrB_{12}$), hafnium boride, the vanadium borides ($VB$, $VB_2$), the niobium borides ($NbB$, $NbB_2$), the tantalum borides ($TaB$, $TaB_2$), the chromium borides ($CrB$, $CrB_2$), the molybdenum borides ($Mo_2B$, $MoB$) (alpha and beta) ($MoB_2$ and $Mo_2B_5$), tungsten boride, thorium boride and uranium boride.

Among the carbides that can be produced in accordance with the present process, there can be mentioned titanium carbide, zirconium carbide, hafnium carbide, vanadium carbide, niobium carbide, the tantalum carbides ($Ta_2C$, $TaC$), silicon carbide (alpha and beta), boron carbide ($B_4C$), chromium carbide, molybdenum carbide, the tungsten carbides ($W_2C$, $WC$), the thorium carbides ($ThC$, $ThC_2$), and the uranium carbides ($UC$, $U_2C_3$, and $UC_2$).

Among the nitrides that can be produced in accordance with the present process, there can be mentioned titanium nitride, silicon nitride, zirconium nitride, hafnium nitride, vanadium nitrides ($VN$, $V_3N$), niobium nitride, tantalum nitride, boron nitride, the chromium nitrides ($Cr_2N$, $CrN$), tungsten nitrides ($Mo_2N$, $MoN$), thorium nitride, the uranium nitrides ($U_2N_3$, $UN_2$), neptunium nitride and plutonium nitride.

Any convenient method for bringing the reactants together at reaction temperatures can be used. Thus, for example, the reactants can be heated individually to or above reaction temperature and then admixed in a suitable reaction zone; further, one or more, but not all, of the reactants can be heated to temperatures in excess of reaction temperature and admixed in the reaction zone with the remaining reactant(s), which have been introduced into the reaction zone at temperatures below reaction temperature. The highly heated reactant(s) bring the remaining reactant(s) to reaction temperature quickly and cause formation of the composition desired. Further, the reactants can be introduced into the reactor at below reaction temperature and heated with a very hot heat source, e.g., an inert (argon) plasma or a hydrogen plasma.

Reaction temperatures for the processes described herein will, of course, vary with the reactants and the products being produced. Generally, such reaction temperatures will range from about 300° C. to about 3000° C. Reaction temperatures for the production of various carbides, nitrides, borides from various reactants are known and can be found on pages 61, 226, 275, and 322, respectively, of the reference text, *Refractory Hard Metals*, supra. That disclosure is incorporated herein by reference.

The ultimate particles of the products produced by the described vapor phase processes are typically submicron in size and range from about 0.01 to about 1.0 micron. The finely divided product that is collected is typically in the form of agglomerates of ultimate particles, typically between about 0.1 and 10 microns or more in nominal sectional diameter.

Apparatus useful for the preparation of the aforementioned borides, carbides, and nitrides in accordance with this invention is illustrated in the Figure. The plasma generator heating means 1, reactant inlet assembly (mixer) means 30, and reactor 34 are described in detail in Offenlegungsschrift 25 23 423, which description has been incorporated herein by reference. Briefly, plasma heater 1 has a grounded annular anode 11 aligned coaxially with cathode rod 3, which is mounted in electrically non-conductive insulating sleeve 9. Coolant such as water is circulated through cooling chambers 7 and 13 by circulating means (not shown). Plasma or work gas, such as hydrogen, is introduced through conduit 17 and flows via annular conduit 19 through annular space 21 between the anode and cathode, where the plasma gas is heated by an arc passing between anode and cathode, and the heated gas leaves through outlet conduit 23. The cathode and anode are connected by electrical connecting means (not shown), to a power supply (not shown), typically a direct current power supply.

Reactant mixer 30 includes two coaxial, longitudinally spaced annular conduits 42 and 47 having exit ports 43 and 48 respectively. Reactants from reactant supply means (not shown) are introduced into conduits 42 and 47 through inlets 40 and 45 respectively and flow into reactant introduction zone 24 where they mix with and are heated by the hot gas stream coming from outlet conduit 23. The mixed gases then pass into reactor 34, preferably at the center spaced from the walls of the reactor, and react therein to form finely divided powdery product.

The finely divided powdery product, which is suspended or entrained in reactant product gases as well as excess reactant gas and plasma gas, hereinafter collectively referred to as the reactor effluent gas stream, is removed from reactor 34 through conduit 36 and is introduced into filter unit 50 in order to separate the solid product powder from the reactor effluent gas stream. The submicron particles of product powder are formed completely in the reactor and since the reactor effluent is cooled to below reaction temperatures substantially immediately, substantially no metal boride, carbide, or nitride formation or individual particle growth (other than by physical aggregation) occurs outside the reactor.

The use of plasma heating means 1, reactant mixer 30 and reactor 34 is already known. In the Figure, an embodiment of the contribution of the present invention to the art is illustrated particularly by filter unit 50, which has a filtration chamber 52, a gas exit manifold 54, and porous bayonet filters 51. Powdery product entrained in reactor effluent gas stream enters the filtration chamber at inlet 37 and collects on the outer surfaces of porous bayonet filters 51. The filters 51 are mounted in circular separator plate 53 which separates exit manifold 54 from filtration chamber 52. In the illustration, 6 bayonet filters 51 are mounted in hexagonal array around the periphery of the plate and 1 is mounted in the center. Of these, 5 are showing: 3 along a diameter of the separator plate 53 and 2 behind; the remaining 2 bayonets, which would appear forward of said diameter, are not shown. As powdery product collects on filters 51, effluent gas passes through the collected product, through the porous walls 56 of the bayonet filters 51, and thence through conduits 49 (one shown) into the exit manifold 54. Filter shell 55 is sealed to product receiver 73 in a gas-tight manner through coupling 70, so that effluent gas must flow out through the filters 51. Valves 67 and 68 allow both the filter unit and the product receiver to be closed from the atmosphere before they are separated. The receiver is provided with a purge tube 71 having a valve 72 through which purge gas, e.g., argon, may be admitted to the receiver. The receiver is heated with the use of conventional heating means (not shown).

During operation of the filter unit, a filter cake of powdery product builds up on the surface of the porous bayonet filters 51. Periodically as required to maintain adequate flow rates through the filter unit, accumulated product is dislodged from the bayonet filters. The dislodged product drops down through outlet 57 into receiver 73. Preferably, a stream of inert purge gas such as hydrogen, argon, helium, or neon is admitted to receiver 73 through tube 71 in order to sweep volatile impurities from the receiver up into the filter unit 50. The product is dislodged from the filters by periodically reversing the flow of gas through one or more of the bayonet filters, although preferably not all at one time. For this purpose, each bayonet is provided with a jet nozzle 58 through which a pulse of compressed gas is sent down into the bayonet at intervals to reverse momentarily the flow of gas through the porous walls 56 of the bayonet filters. The pulse gas, which may be hydrogen or other inert gas such as argon, is admitted to the jet nozzle through conduit 59 from pulse gas supply means (not shown). Between pulses, each jet nozzle is closed, e.g., by means of a valve (not shown) to prevent backflow of effluent gas through the nozzle. Product may also be dislodged by shaking or vibrating the bayonet filters with a shaking means (not shown), or a combination of vibration and gas pulses may be used.

Effluent gas leaves exit manifold 54 through outlet 60 and passes via conduit 61 to conventional scrubber 62, in which the gas passes through a bed 64 of conventional chemically inert packing, e.g., helices or saddles, through which caustic aqueous scrubbing liquid from inlet 63 is passed. The scrubber traps fine particles, if any, that pass through the filter and neutralizes acidic species in the effluent stream. The scrubbed stream passes through outlet 65 to a flue or to a means for recovery of unreacted reactants.

As stated above, temperatures in the reactor may vary between about 300° C. and 3000° C., and the powdery product is separated from the effluent gas stream at temperatures between about 200° C. and 1500° C. or higher, for example between about 200° and 600° C., more typically between about 250° and 370° C. Some cooling of product and effluent stream may occur between the reactor and the filter unit, but the temperature is maintained at least at 200° C. at all times until after the product and the effluent gas are separated. Separation of product from the effluent stream at high temperatures, e.g., at least about 200° C., rather than at lower temperatures lowers the amount of adsorbed impurity on the product. Purging of the receiver serves to limit the diffusion of gaseous impurity from the filter unit to the receiver, but if the receiver is much cooler than the filter unit, an excessive volume of purge gas may be required to limit diffusion adequately. Thus, it is preferable to heat the receiver during the period when it is open to the filter unit to at least about 200° C., preferably to at least the temperature in the filter unit or higher.

Although a particularly convenient arrangement of bayonet filters is shown in the Figure, other arrangements that permit convenient removal of accumulated product may also be used in the practice of this invention. The filter unit and the filters themselves are inert, i.e., they are constructed from materials resistant to the temperatures and corrosive environment to which they are exposed during operation and do not contaminate the finely divided product. Filters useful in this invention, such as the bayonet filters 51 shown in the Figure, include heat and corrosion resistant sintered articles which have porous walls through which the effluent gas can pass, but which prevents passage of the powdery product. Useful filters in a variety of porosities and made of a variety of suitable materials, notably sintered metals such as stainless steel, nickel, tungsten, monel, and inconel, and sintered refractories such as silica and alumina, are available commercially. However, porous sintered metal filters, such as nickel, tungsten, stainless steel, monel, and inconel filters, are preferred for availability and mechanical toughness and strength.

The porosity of the filters is such that substantially all, that is, at least about 90 percent, for example 99 percent or more, of the entrained powdery product is separated from the effluent gas stream as it passes through the filters. It is well known that the effectiveness of a filter depends upon the pore sizes and pore size distribution of the filter and upon the particle size, particle size distribution, and the shape and extent of agglomeration of the particles, and further that a highly efficient filter may have pores many times the size of the particles to be retained on the filter. In the initial period of separation, the efficiency of the filter may be less than is desired, but a precoat of powder quickly builds up on and in the surface of the filter, so that its operating efficiency is higher, often much higher than its initial efficiency, with regard both to the weight percentage of powder retained and to the minimum particle size retained.

It is very difficult to specify exactly the required porosity for a particular application because of the many variables involved. In Catalog No. 1000 of the Mott Metallurgical Corporation, Farmington, CN 06032, filters of the following nominal spherical particle retention grades are described (Table I):

TABLE I

Nominal Spherical Particle Retention, Microns 0.5

2.0

5.0

10.0

20.0

40.0

100.0

It has been found that a Mott sintered nickel filter having a nominal retention of 5.0 microns operates at efficiencies of greater than 99 percent when used to filter submicron particulate titanium diboride of which at least 90 weight percent of the particles are between about 0.05 and 1.0 microns in nominal sectional diameter. It is believed that the particles are agglomerated to a great extent in agglomerate sizes that do not pass through the filter. Filters having smaller nominal retention ratings, e.g., 2.0 microns, are also useful, but will entail a greater pressure drop and therefore lower rates of filtration. Filters having larger nominal retention ratings may also be used if the particles or agglomerates thereof to be collected are of sufficient size. The selection of a filter having suitable porosity for a particular application is a routine procedure for one skilled in the art. Similarly, the choice of filter size, that is, the surface area available for filtration, is a matter of routine engineering and design.

The powdery metal boride, carbide, and nitride products are made and handled and recovered under inert atmosphere, that is, in the substantial absence of air, particularly of oxygen and water vapor, and upon recovery are maintained under an inert atmosphere such as argon, neon, or helium. Some of these compounds, such as finely divided titanium diboride, react with oxygen or moisture in air upon contact at room temperature, forming the corresponding metal oxide. If any unreacted metal halide remains adsorbed on the product, it can also react to give oxide impurity. Thus, assuming reactants of adequate purity are used, the powdery product has low oxygen content, preferably below about 1 percent by weight, when maintained under inert atmosphere.

Separation of the product from the effluent stream at temperatures above about 200° C. rather than at lower temperatures results in a lower level of adsorbed volatile impurity. Such impurity primarily includes unreacted metal halide, reactant, e.g., titanium tetrachloride, partially reduced subhalides thereof, and hydrogen halide. Thus, the level of adsorbed volatile impurity on the product can be found by measuring the halogen content of the product. Product recovered from effluent gas stream in accordance with this invention has a total halogen content, typically chlorine, of less than about 1 percent by weight, typically less than about 0.25 percent, often less than about 0.1 percent.

EXAMPLE

Submicron titanium diboride (T:B$_2$) having a B.E.T. (Brunauer, Emmett, and Teller, *Journal of American Chemical Society*, 60, 309 (1938), N$_2$ adsorption method) surface area of 9.1 square meters per gram, at least 50 weight percent of its particles in range of about 0.05 to 1.0 microns in nominal sectional diameter, about 95 number percent of its particles below about 1.0 micron and containing coproduced submicron titanium carbide was prepared by vapor phase reaction of TiCl$_4$, BCl$_3$, and 1,1,2-trichloroethane in accordance with the process described in Offenlegungsschrift No. 25 23 423. Powdery TiB$_2$ entrained in the reactor effluent gas stream was separated from the effluent stream at 277°–305° C. and 4.0 pounds per square inch gauge in a 7-bayonet filter unit similar to that shown in the Figure. The gas flow rate was 300 actual cubic feet per hour per square foot of filter area, and TiB$_2$ was accumulated at the rate of 0.78 pounds per hour per square foot of filter area. Substantially no TiB$_2$ was detected in the effluent gas stream flowing from the filter unit. The filter material was Mott sintered nickel having a wall thickness of 1/16 inch and a nominal spherical particle retention rating of 5.0 microns. The filter housing was vibrated two to three times per minute for about 1 second each time, and one bayonet was cleaned by a reverse flow of hydrogen for 0.5 second every 250 seconds in rotation. The product dislodged from the filter bayonets dropped into an argon purged receiver which was maintained at 285° to 299° C. during the collection period, about 5 hours, and then allowed to cool. An argon atmosphere was maintained in the receiver during cooling.

Upon analysis, the product from the receiver was found to contain 0.08 weight percent chlorine.

Although this invention has been described with reference to particular details and illustrative examples, the description is not intended to limit the invention, the scope of which is defined in the accompanying claims.

I claim:

1. In the process of producing refractory metal boride, carbide, or nitride powder of a metal selected from Groups III–VI of the Periodic Table of the Elements by vapor phase reaction of (a) a vaporous halide of the selected metal and (b) a vaporous source of boron, carbon, or nitrogen respectively, wherein reactants (a) and (b) are reacted in a reactor to form finely divided refractory metal powder and the resulting metal powder is recovered, the improvement which comprises:

withdrawing from the reactor refractory metal powder entrained in the reactor effluent gas stream and forwarding directly said effluent gas into a filtration zone, the temperature of said refractory powder and effluent gas being at least 200° C., separating substantially all of the entrained finely divided refractory metal powder from the effluent gas stream in said filtration zone by passing the effluent gas stream through an inert porous metal filter, removing powder collected on the filter from the filter and forwarding the powder so removed to a receiver which is purged with inert gas and maintained at least at 200° C., and cooling the powder to less than 200° C. under an inert atmosphere.

2. The process of claim 1, wherein the ultimate particles of the refractory powder are submicron in size.

3. The process of claim 2, wherein the refractory powder is the diboride of titanium, zirconium, or hafnium.

4. The process of claim 3, wherein the refractory powder is titanium diboride, the metal halide is titanium tetrachloride, and the source of boron is boron trichloride.

5. The process of claim 1, wherein the temperature is between 200° C. and 600° C.

6. The process of claim 5, wherein the temperature is between about 260° C. and 370° C.

7. The process of claim 5 wherein the refractory powder is a boride, carbide or nitride of a metal of Groups IV-V of the Periodic Table of the Elements.

8. The process of claim 5 wherein the refractory powder is a boride or carbide of a metal selected from the group titanium, zirconium, hafnium, silicon, and tungsten.

* * * * *